United States Patent
Swartz et al.

[11] Patent Number: 6,015,090
[45] Date of Patent: Jan. 18, 2000

[54] HAND MOUNTABLE ADAPTIVE BARCODE SCANNER

[75] Inventors: Jerome Swartz, Old Field; Edward Barkan, Miller Place; Glenn S. Spitz, Far Rockaway; Joseph Katz; Boris Metlitsky, both of Stony Brook, all of N.Y.

[73] Assignee: Symbol Technologies, Inc., Holtsville, N.Y.

[21] Appl. No.: 08/893,669

[22] Filed: Jul. 11, 1997

Related U.S. Application Data

[63] Continuation of application No. 08/415,503, Apr. 3, 1995, abandoned, and a continuation-in-part of application No. 07/562,130, Aug. 3, 1990, Pat. No. 5,151,580, and application No. 07/553,559, Jul. 16, 1990, abandoned, said application No. 08/415,503, is a division of application No. 08/317,775, Oct. 4, 1994, which is a continuation of application No. 07/897,835, Jun. 12, 1992, abandoned, which is a continuation of application No. 07/260,692, Oct. 21, 1988, Pat. No. 4,933,538.

[51] Int. Cl.[7] .................................................. G06K 7/10
[52] U.S. Cl. .......................................... 235/472; 235/462
[58] Field of Search .................................. 235/472, 462, 235/455

[56] References Cited

U.S. PATENT DOCUMENTS

| | | | |
|---|---|---|---|
| 4,251,798 | 2/1981 | Swartz et al. | 235/462 |
| 4,360,798 | 11/1982 | Swartz et al. | 235/463 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,548,463 | 10/1985 | Cato et al. | 359/18 |
| 4,675,955 | 6/1987 | Nakamura | 24/656 |
| 4,734,566 | 3/1988 | Senda et al. | 235/455 |
| 4,736,095 | 4/1988 | Shepard | 235/472 |
| 4,760,248 | 7/1988 | Swartz et al. | 235/472 |
| 4,766,299 | 8/1988 | Tierney | 235/472 |
| 4,792,666 | 12/1988 | Cherry et al. | 235/466 |
| 4,794,239 | 12/1988 | Allais | 235/462 |
| 4,800,256 | 1/1989 | Broockman et al. | 235/467 |
| 4,808,804 | 2/1989 | Krichever et al. | 235/462 |
| 4,882,476 | 11/1989 | White | 235/462 |
| 4,896,026 | 1/1990 | Krichever et al. | 235/472 |
| 4,933,538 | 6/1990 | Heiman et al. | 235/462 |
| 5,115,121 | 5/1992 | Bianco et al. | 235/467 |
| 5,144,120 | 9/1992 | Krichever et al. | 235/472 |
| 5,149,948 | 9/1992 | Chisholm | 235/462 |
| 5,191,197 | 3/1993 | Metlitsky | 235/472 |
| 5,200,597 | 4/1993 | Eastman et al. | 235/455 |
| 5,243,602 | 9/1993 | Akagi, Jr. | 371/25.1 |
| 5,260,554 | 11/1993 | Grodevant | 235/462 |
| 5,272,323 | 12/1993 | Martino | 235/462 |
| 5,324,924 | 6/1994 | Cai et al. | 235/463 |
| 5,340,972 | 8/1994 | Sandor | 235/472 |

FOREIGN PATENT DOCUMENTS 0 498 366 A2  8/1992  European Pat. Off. .

OTHER PUBLICATIONS

Barkan et al., "Depth of modulation and spot size selection in bar–code laser scanners," Advances in Laser Scanning Technology, SPIE, vol. 299, Aug. 27–28, 1981, pp. 82–97.
Barkan et al., "System design considerations in bar–code laser scanning," Optical Engineering, vol. 23, No. 4, Jul./Aug. 1984, pp. 413–420.

*Primary Examiner*—Anita Pellman Gross
*Assistant Examiner*—Karl Frech
*Attorney, Agent, or Firm*—Finnegan, Henderson, Farabow, Garrett & Dunner, L.L.P.

[57] ABSTRACT

A hand-mountable adaptive bar code scanner includes a scanner for generating a light beam directed toward a target, the light beam sweeping the symbol to be read. The scanner further includes a photodetector for receiving reflected light from such symbol, and circuitry to determine whether the signal received is sufficiently distinct to determine that a valid symbol has been scanned, and signal processing circuitry having adjustable gain, bandwidth, and digitizer threshold characteristics for processing such signals.

16 Claims, 4 Drawing Sheets

HAND MOUNTABLE ADAPTIVE BARCODE SCANNER

This application is a continuation of application Ser. No. 08/415,503 filed Apr. 3, 1995, now abandoned, which is a divisional of U.S. patent application Ser. No. 08/317,775 filed Oct. 4, 1994 (pending), which is a continuation of U.S. patent application Ser. No. 07/897,835, filed Jun. 12, 1992, now abandoned, which is a continuation-in-part of U.S. patent application Ser. No. 506,674, filed Apr. 9, 1990, now abandoned which in turn is a continuation of Ser. No. 260,692, filed Oct. 21, 1988, now U.S. Pat. No. 4,933,538. This application is also a continuation-in-part of U.S. patent application Ser. No. 562,130, filed Aug. 3, 1990, now U.S. Pat. No. 5,151,580 and U.S. patent application Ser. No. 553,559, filed Jul. 16, 1990 now abandoned. This application is further related to U.S. patent applications Ser. No. 790,627, filed Nov. 12, 1991, which is a divisional of said Ser. No. 562,130, and Ser. No. 635,431 filed Dec. 28, 1990, all of said applications being assigned to Symbol Technologies, Inc.

BACKGROUND OF THE INVENTION

1. Field of the Invention

This invention generally relates to scanners operative for electro-optically reading indicia having parts of different light reflectivity, for example, bar code symbols, and, more particularly, to control circuitry in such scanners to enable the scanner to adapt to specific application environments and symbol readability conditions. The invention also relates to an optical design for eliminating collection optical components in the return path along which light reflected off the indicia travels.

2. Description of the Related Art

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, a light beam, at a target and a symbol to be read.

The light source in a laser scanner bar code reader is typically a gas laser or semiconductor laser. The use of semi-conductor devices as the light source in scanning systems is especially desirable because of their small size, low cost and low power requirements. The laser beam is optically modified, typically by a focusing optical assembly, to form a beam sport of a certain size at the target distance. It is preferred that the cross section of the beam spot at the target distance be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

in order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference. Another structure, known as "PDF 417", described in U.S. patent application Ser. No. 461,881.

In the scanning systems known in the art, the light beam is directed by a lens or similar optical components along a light path toward a target that includes a bar code symbol on the surface. The scanner operates by repetitively scanning the light beam in a line or series of lines across the symbol by means of motion of a scanning component, such as a mirror, disposed in the path of the light beam. The scanning component may either sweep the beam spot across the symbol and trace a scan line across and past the symbol, or scan the field of view of the scanner, or do both.

Bar code reading systems also include a sensor or photodetector which functions to detect light reflected or scattered from the symbol. The photodetector or sensor is positioned in the scanner in an optical path so that it has a field of view which extends across the slight past the symbol. A portion of the light which is reflected or scattered off the symbol is detected and converted into an electrical signal. Electronic circuitry or software decodes the electrical signal into a digital representation of the data represented by the symbol that has been scanned. For example, the analog electrical signal operated by the photodetector may be converted into a pulse width modulated digital signal, with the widths corresponding to the physical widths of the bars and spaces. Such a digitized signal is then decoded based upon the specific symbology used by the symbol into a binary representation of the data encoded in the symbol, and subsequently to the alphanumeric characters so represented.

The decoding process in known bar code reading systems usually words in the following way. The decoder receives the pulse width modulated digital signal from the bar code reader, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

It must be recognized that the overall performance of a scanning system for reading symbols is a function not only of the optical, but also of the electronic sub-system. A measure of the overall performance of a bar code reader is the ability to resolve narrowest elements and to decode symbols located perhaps hundreds of inches away from the reader. The optical subsystem will focus the beam to have a certain measurable spot size, but the electronic sub-system, and particularly the analog signal processing circuitry, also has a role to play in contributing to the detection and spot size. One method of measuring the contribution of the circuitry is by the concept of effective spot size which was introduced by Eric Barkan and Jerome Swartz in the following two articles:

1. "Advances in Laser Scanning Technology", Proceedings of The International Society For Optical Engineering, Volume 299, Aug. 27–28, 1981.
2. "System Design Considerations in Bar-Code Laser Scanning", Optical Engineering, Volume 23, No. 4, Pages 413–420, July/August, 1981.

The concept of effective spot size was defined in such articles by the following equation:

wherein: wherein: $W_{eff}(2) = \sqrt{W_{ept}^2(2) + W_{ep}^2(2)}$ $W_{ept}$ is the spot size of the focused beam at the focal plane due solely to the optical system; and $W_{el}$ is the addition to the spot size caused by the electrical system.

The $W_{el}$ parameter is a function of the frequency bandwidth or the time constant of the analog system processing circuitry, as well as a function of the laser beam spot velocity at the focal or scanning plane. With increasing distance from the housing, the contribution of $W_{el}$, results in an increase in the value of $W_{eff}$, thereby degrading overall system performance at such far-out distances. At too long a far-out distance, the symbol can no longer be read.

Prior to the present invention, the adjustment of scanning parameters was made on a piecemeal basis, by independently adjusting a single parameter like beam intensity or amplifier gain. No consideration was given to the simultaneously adjusting several different optical and electrical parameters together so that the readability of a symbol at a given distance or range of distances or a particular application or operational object (e.g., maximum working range) is optimized.

SUMMARY OF INVENTION

The invention provides for a hand mountable data processing device comprising a housing that is mountable on the back of a human hand. The housing has two side panels perpendicular to a palm of the hand that attach to a to panel lying parallel to the palm of the hand. A palm strap extends around the palm of the hand and fastens at each of two ends of the strap to the two side panels. A keyboard is mounted to the top panel and a display is mounted on the top panel for displaying data. In a preferred embodiment, the housing includes a wrist strap for connecting the device to the wrist of a user. In another embodiment, a device for reading bar code symbols is mounted on the housing.

The novel features characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Figure 1:
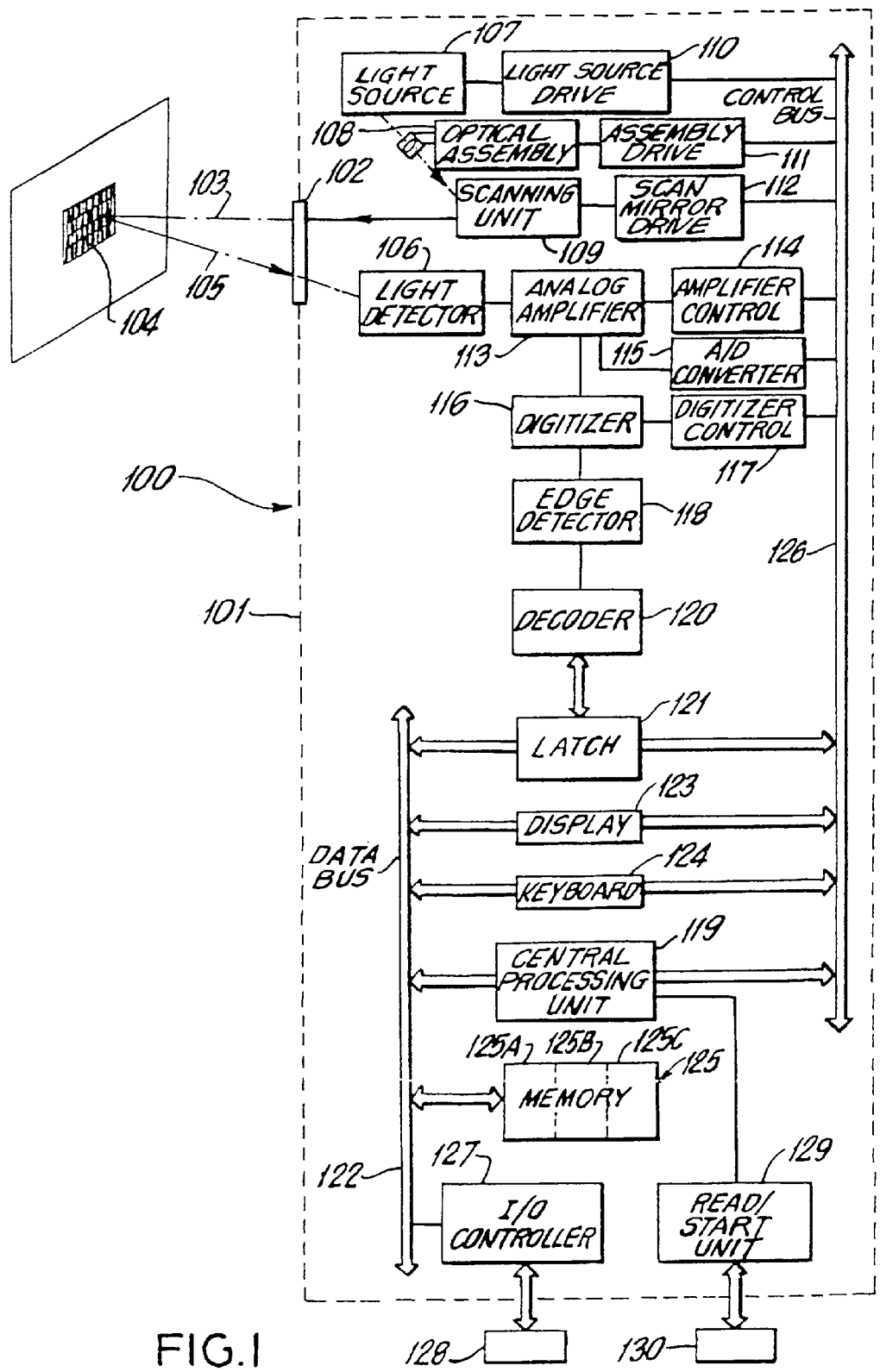
FIG. 1 is a highly simplified block diagrammatic representation of a scanning system for reading bar codes.

As used in this specification and the following claims, the term "symbol" and "bar code" is intended to be broadly construed and to cover not only patterns composed of alternating bars and spaces of various widths, but also other one or two dimensional graphic patterns, as well as alphanumeric characters.

The invention generally relates to a scanner systems utilizing a light source for reflecting light off indicia of different light reflectivity such as bar code symbols. More particularly, the invention provides a scanner system in which adjustment of various optical parameters of the scanning beam and/or electrical parameters of the light detecting and processing circuitry is automatically made to effect appropriate detection, sweeping and/or scanning or symbols to be read. The invention further provides a method for operating a scanner system by providing signals to the current drive of the light source and the scanning motor controller in response to detection of indicia which represents or may represent a portion of a desired target, such as a bar code symbol.

The present invention also relates to scanning systems incorporating techniques for automatically initiating and terminating scanning of the target. One feature of some scanner systems is the use of a manually operated trigger to initiate scanning of the target, such as described in U.S. Pat. No. 4,387,297. Although for many applications the use of a trigger is an important feature, there are some applications in which it may be desirable to sue alternate activation technique to initiating scanning, and such techniques are described herein and also within the scope of the present invention.

U.S. Pat. No. 4,933,538, assigned to the assignee of this application, describes a bar code reader including a processor which determines whether the reflected light represents a spatial variation that could represent a bar code and generates an enabling signal in response to such determination. A controller is provided for modifying the light beam in response to the enabling signal by changing the intensity, spot size, scanning path, and/or rate of scanning of the light beam.

U.S. Pat. No. 4,808,804, also assigned to the assignee of this application, describes a bar code reading system in which the working distance or beam spot size may be changed.

The present invention extends the technique of processing and analysis of the reflected light as originally set forth in the aforesaid U.S. Pat. No. 4,933,538. The present invention also extends the technique of controlling the bar code reader by not only modifying the light beam, if necessary, such as described therein or in U.S. Pat. No. 4,808,804 but also adjusting electrical parameters in the detection and signal processing portion of the bar code reader.

U.S. patent application Ser. No. 553,559, filed Jul. 16, 1990 and assigned to the assignee of this application, describes a bar code reader in which a microprocessor is utilized to control motor scan speed, laser power, gain of analog amplifier, and digitizing thresholds to help decode difficult-to-read symbols. Proper settings determined during manufacturing can be stored in non-volatile memory.

The present invention elaborates on the technique of utilizing the microprocessor as originally set forth in the aforesaid U.S. patent application Ser. No. 553,559.

U.S. patent application Ser. No. 562,130, filed Aug. 3, 1990 and assigned to the assignee of this application, describes a bar code reader in which characteristics of bar code symbols being read are detected and processed to determine whether the symbols are high-density or low-density bar code symbols. The signal processing circuitry of the reader is altered in bandwidth in response to the results of such determination. In this manner, the bandwidth best suited for reading the type of bar code being detected is utilized by the signal processing circuitry. A wide bandwidth will allow more noise to propagate through the processing circuitry, and so the bandwidth is narrowed to use only that which is needed. Low density bar codes do not require as much bandwidth in the signal processing circuitry as high-density bar codes. The present invention extends the technique described in the aforesaid U.S. Patent Application as well.

In a barcode scanner, it is common for various operational parameters to be defined in software to adapt the scanner for use in specific applications. For example, the data rate of information transfer, or other interface parameters, as well as the types of symbologies to be decoded, are frequently determined by the user or by the scanner manufacturer and the specific scanner model configured for the application environment in which it is to operate.

Sometimes it is also desirable to adjust or modify the electrical parameters or functions of certain scanner hardware to better enable the scanner to perform in reading symbols associated with a particular application. For example, a scanner that is to be used to read dot matrix printed symbols on a high speed conveyor needs to have certain parameters set in a particular way compared to a scanner used to read stationary high density symbols.

To optimize the performance of a bar code scanner, such parameters as motor speed, amplifier gain, laser power, amplifier bandwidth and digitizer thresholds are commonly adjusted and set at the time of manufacture or upon installation of the scanner. Such adjustment has typically been performed by installing particular component values on the circuit board or by adjusting trimpots. A skilled technician or engineer is needed to properly determine how these adjustments are to be made.

The present invention provides adjustable circuitry in a bar code scanner such that all the types of adjustments mentioned above, and perhaps others, can be made under the control of a microprocessor. The same microprocessor used to decode symbols and/or interface with external equipment can be used for such adjustment operations. Such adjustments may be made during the manufacturing process for producing different models of bar code readers having predetermined or preset operating characteristics for dedicated use by the customer. Such adjustments may also be implemented by the customer at the time of installation, or at the beginning of a particular job. Such adjustments can also be made by the scanner automatically when placed in a "self-adjusting" mode, so that the scanner automatically adjusts to the symbol being presented to it.

Microprocessors can make these adjustments of optical and electrical parameters in various ways depending upon the accuracy and resolution needed. Examples of circuits that can be implemented in order to enable the microprocessor to make these adjustments are digital to analog convertors, digital potentiometers, analog switches, FETs and transistors.

Another application of the present invention are those applications in which optimized parameters for different target ranges are stored in memory and then automatically called up by the processor when a Symbol at a particular target range is presented to the scanner. Examples of such applications include the reading of bar codes on packages on a conveyor belt, in which the bar code label on the packages are situated at a number of different distances from the scanner.

Referring to FIG. 1, there is shown a highly simplified block diagram representation of an embodiment of one type of bar code reader that may be designed according to the principles of the present invention. The reader 100 may be implemented in a portable scanner, or as a desk-top workstation or stationery scanner. In the preferred embodiment, the reader is implemented in a light-weight plastic housing 101.

Figure 2:
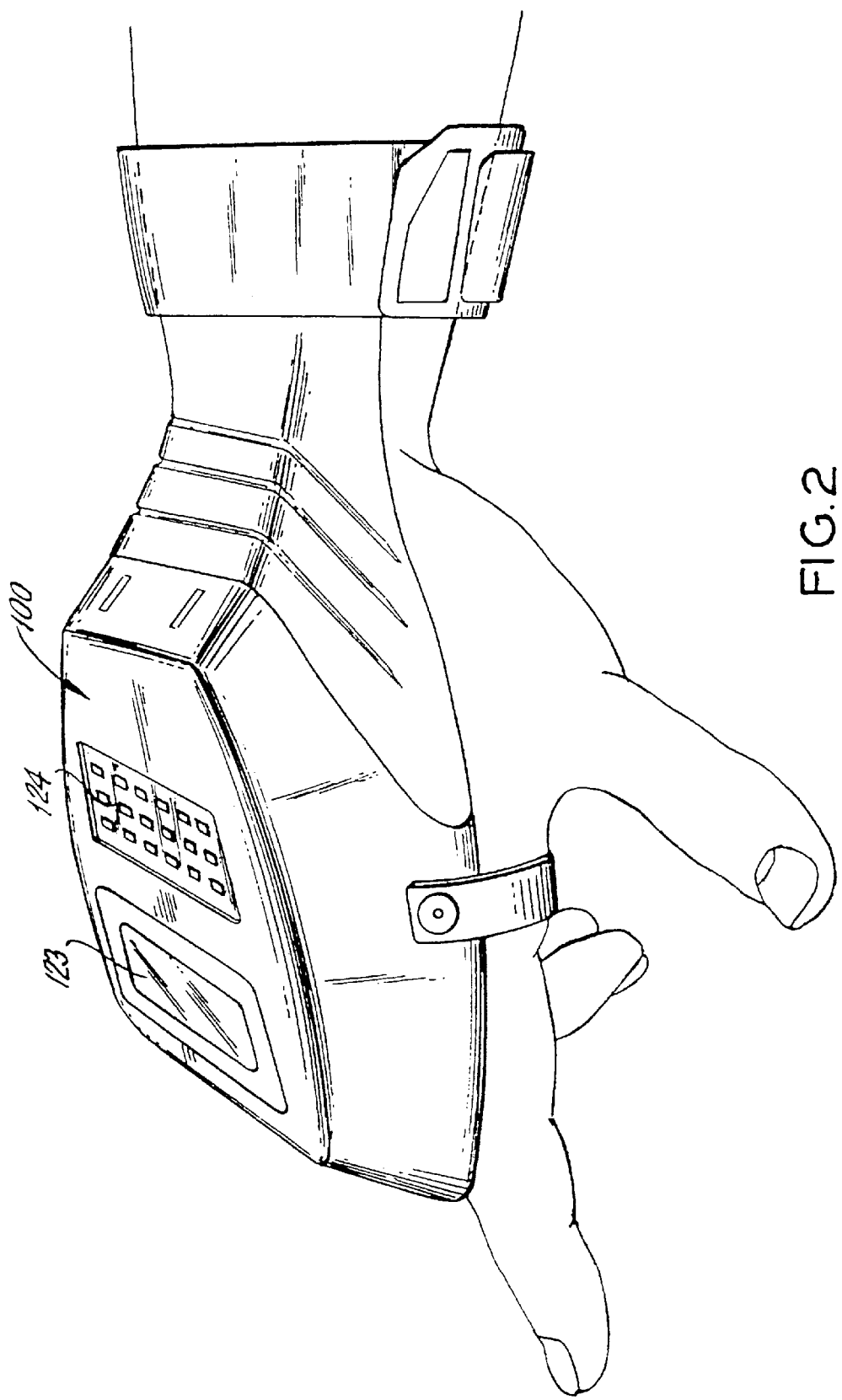
FIG. 2 is a perspective view of one embodiment of a bar code reader according to the present invention.
Figure 3:
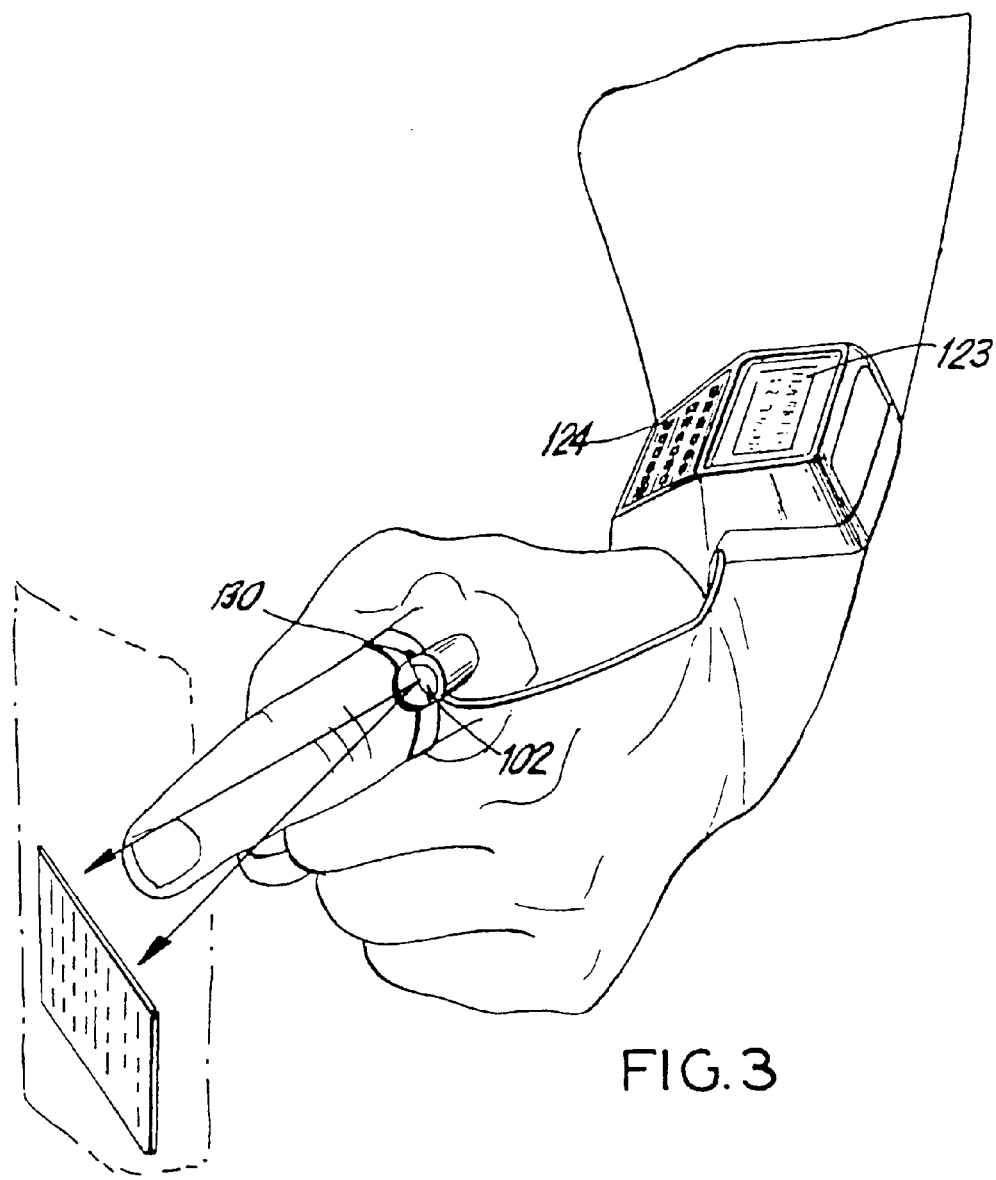
FIG. 3 is a perspective view of a second embodiment of a bar code reader according to the present invention.

In one preferred embodiment, the reader 100 may be a gun shaped device, having a pistol-grip type of handle; a second embodiment is a hand-mounted unit, such as shown in FIG. 2; a third embodiment is a ring-scanner, such as shown in FIG. 3. The hand-mounted unit shown in FIG. 2 includes a housing with two side panels perpendicular to a palm of a user's hand and a top panel lying parallel to the palm of the hand. A palm strap extends around the palm of the hand and fastens to each of two ends of the strap to the two side panels. At least one of the ends of the palm strap is pivotally attached to the side panel as shown in FIG. 2. A wrist strap is attached to the housing for wrapping around the user's wrist. A display 123 and a keyboard 124 are mounted on the top panel for displaying data. A movable trigger switch (shown on FIG. 3) on the housing may be employed to allow the user to manually activate the scanner when the user has positioned the device to point at the symbol to be read. Various "triggerless" activation techniques can also be used as will be subsequently described.

The first preferred embodiment may generally be of the style disclosed in U.S. Pat. No. 4,760,248, issued to Swartz et al, or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al, or U.S. Pat. No. 4,409,470 issued to Shepard et al, both such patents assigned to Symbol Technologies, Inc., may be employed in constructing the bar code reader unit of FIG. 1. These U.S. Pat. Nos. 4,760,248, 4,896,026 and 4,409,470 are incorporated herein by reference, but the general design of such devices will be briefly described here for reference.

Turning in FIG. 1 in more detail, an outgoing light beam 103 is generated in the reader 100 by a light source 107, usually a laser diode or the like. The light beam from light source 107 is optically modified by an optical assembly 108 to form a beam having certain characteristics. The beam sized and shaped by the assembly 108 is applied to a scanning unit 109. The light beam is deflected to the scanning unit 109 in a specific scanning pattern, i.e. to form a single line, a linear raster scan pattern, or more complex pattern. The scanned beam 103 is then directed by the scanning unit 109 through an exit window 102 to impinge upon a bar code symbol 104 disposed on a target a few inches from the front of the reader. In the embodiments in which the reader 100 is portable, the user aims or positions the portable unit so this scan pattern transverses the symbol 104 to be read. Reflected and/or scattered light 105 from the symbol is detected by a light detector 106 in the reader, producing electrical signals to be processed and decoded for reproducing the data represented by the bar code. As used hereinafter, the term "reflected light" shall mean reflected and/or scattered light.

The characteristics of each of the optical components 107, 108 and 109 may be independently controlled by drive units 110, 111 and 112 respectively. The drive units are operated by digital control signals sent over the control bus 126 by the central processing unit 119, which is preferably implemented by means of a microprocessor contained in the housing 101.

The output of the light detector 106 is applied to an analog amplifier 113 having an adjustable or selectable gain and bandwidth. An amplifier control unit 114 is connected to the analog amplifier 113 to effect the appropriate adjustment of circuit values in the analog amplifier 113 in response to control signals applied to the control unit 114 over the control bus 126.

One output of the analog amplifier 113 is applied to an analog-to-digital (A/D) converter 115 which samples the analog signal to be able to be tested by the CPU 119. The A/D converter is connected to the control bus 126 to transfer the sampled digital signal for processing by the CPU 119.

Another output of the analog amplifier 113 is applied to a digitizer 116. The digitizer 116 converts the analog signal from the analog amplifier 113 into a pulse width modulated digital signal. One type of digitizer is described in U.S. Pat. No. 4,360,798. As previously noted, circuits such as those contained in digitizer 116 have variable threshold levels which, according to the present invention, can be appropriately adjusted. The digitizer control unit 117 is connected to the digitizer 116 and functions to affect the appropriate adjustment of threshold levels in the digitizer 116 in response to control signals applied to the control unit 117 by the CPU 119 over the control bus 126.

The output of the digitizer 116 is applied to an edge detector 118. The operation of the edge detector 118 can be explained with reference to FIG. 4.

Figure 4:
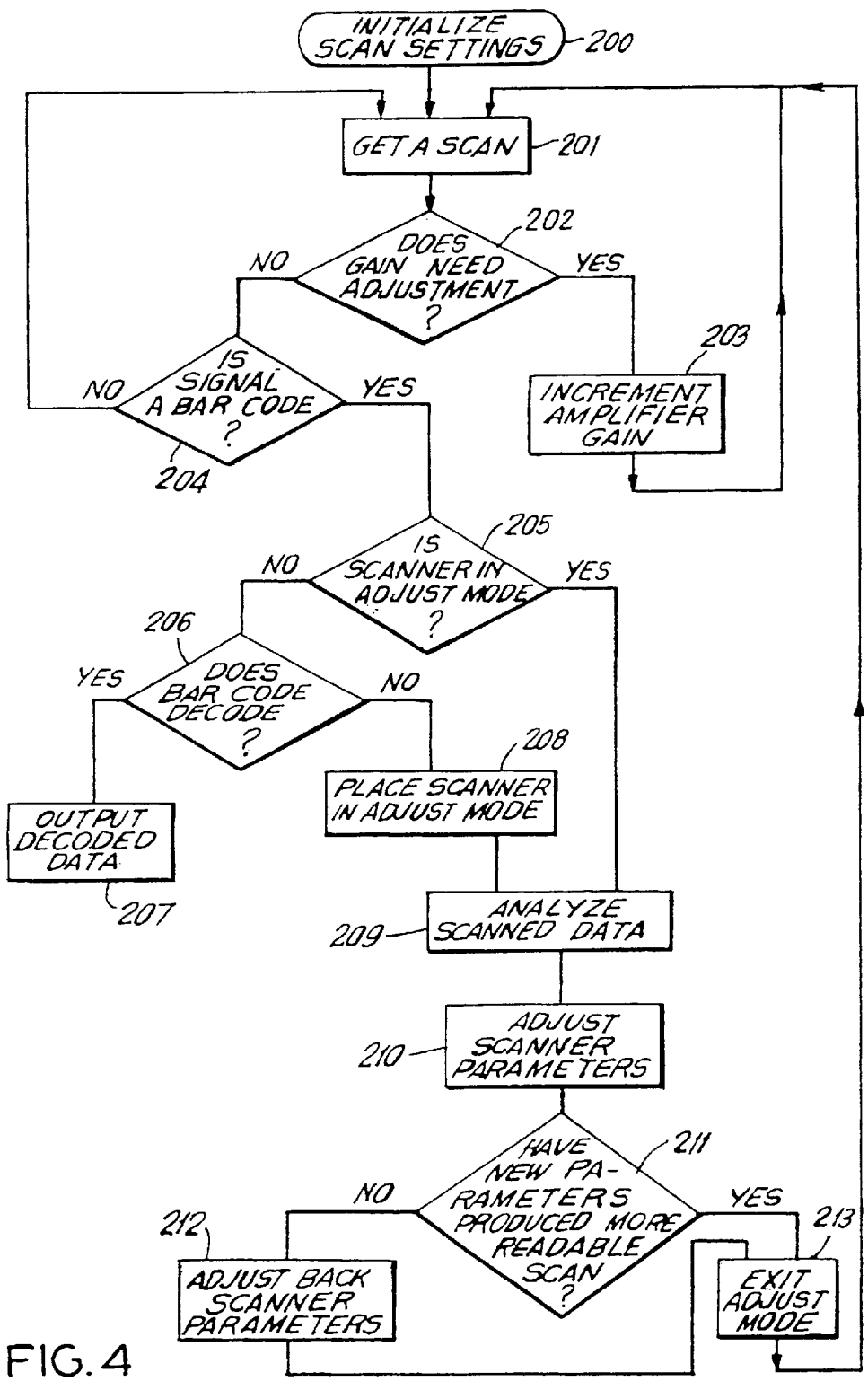
FIG. 4 is a flow chart of an algorithm according to the present invention to determine whether a portion of a bar code has been read, or whether scanner parameters have to be adjusted.

FIG. 4 is a flow chart of an algorithm according to the present invention that functions to determine whether a portion of a bar code has been read, and whether scanner parameters have to be adjusted. It is assumed that certain predetermined initialization parameters are automatically set when the scanner is turned on, as represented by block 200. The scanner is then placed in an "adjust" mode (as opposed to a "read" mode) and the algorithm proceeds.

In the following discussion, reference numerals in parenthesis refer to the functional blocks shown in the flow chart of FIG. 5. A scan is obtained (201) and the resulting signal processed by the analog amplifier 113, the A/D converter 115, and the edge detector 118 is measured and analyzed. Reference may be made to U.S. patent application Ser. No. 635,431 for a type of gain control that is contemplated within the software algorithm according to the present invention. Thus, a determination is made whether the gain of the amplifier 113 needs adjustment (202), and, if so, the gain is incremented (203). Assuming the amplifier gain is appropriate, a determination is made whether the signal is a bar code (204), such as by using the edge detector 118. If the signal is not a bar code or portion of a bar code, the reader does not have a suitable signal to analyze, and data from another scan is obtained (201). If the signal is a bar code, and the reader is in adjust mode (205) the data may be analyzed (209). If the reader is not in adjust mode, and the signal decodes as a proper bar code (206), the data is output (207). If the signal does not decode, the reader is placed in adjust mode (208) and the data analyzed (209).

The method used by the microprocessor CPU 119 to adjust parameters can now be described. Some scanner parameters, such as "motor speed" can be measured and a feedback signal provided to the microprocessor so the microprocessor can tell when proper motor speed has been obtained. A laser power adjustment might need a photosensor either within the scanner or in an external fixture to feed laser power information back to the microprocessor. The monitor photodiode in a laser diode package can be used if it has been calibrated in some way to perform this function.

There are many ways the microprocessor controlled adjustments according to the present invention can be used. During the manufacturing process manual adjustments can be eliminated, thereby reducing cost and increasing product consistency and quality. Special fixtures may be used to aid with some adjustments. For example, the scanner can automatically adjust its scanning angle by scanning a predetermined printed bar pattern. It can also adjust its laser power output with the aid of an external laser power meter that feeds information back to the scanner via an electrical interface. The scanner can also adjust its own amplifier gain, bandwidth and digitizer thresholds to the levels that may be determined from an optimization algorithm. This self-adjusting capability simplifies the manufacturing process by enabling scanners with varying capabilities to be easily made on the same assembly line. Thus, the present invention provides a method of manufacturing a bar code reader method of manufacturing a bar code reader, including the steps of: (a) testing a sample bar code reader during the manufacturing process by directing a light beam at a test symbol of the type to be used in a user application; (b) sensing the light reflected from the test symbol at first and second predetermined distances from said reader to produce an output indication of the relative degree of symbol readability sensed at the different distances; (c) automatically determining the optimum optical and electrical characteristics of the reader so to be able to optimally read symbols of the type presented within the working distance range between the first and second distances; and (d) automatically setting the optical and electrical parameters of the reader to correspond to the working distance range defined by the predetermined distances.

Another feature of the present invention is to provide a method of operating a bar code reader, particularly readers being designed for reading a bar code symbol on a target located within a variable working range of distances between the reader and the bar code symbol depending upon the user application, such readers having an adjustment mode and an operating mode, including the steps of: (a) directing a light beam from the reader at a test symbol of the type to be used in a user application at a predetermined distance from the reader with the reader in the adjustment mode; (b) sensing the light reflected from the test symbol at the predetermined distances to produce an output indication of the relative degree of symbol readability at that distances; (c) automatically determining the optimum optical and electrical characteristics of the reader so to be able to optimally read symbols of the type presented within the working distance range; and (d) automatically setting the optical and electrical parameters of the reader to correspond to the working distance range defined by the predetermined distances. After the parameters are set, such as by storing the values in memory, the reader can be placed in operating mode. Thus, for a particular user task (corresponding to the pre-set working range), the readability will be optimized. If the job or task changes, the user shifts back to adjustment mode, reads another test symbol to reset the parameters, and begins again. Still another embodiment or feature of the present invention is to provide an automatic adjustability capability during use to enable the scanner to be self-optimizing. For example, the scanner can be put into a "Learn" mode with a symbol that needs to be scanned in front of it. The scanner can adjust itself until it obtains the highest percentage of successful scans. This is particularly useful in industrial conveyor applications where symbol type and distance to the scanner are fairly consistent. The scanner can also adjust itself to cover a specified range of working distances or symbols with certain readability qualities if presented with symbols at the extremes of the user requirements.

In all of the embodiments described above, once the proper adjustments have been made, the parameter values can be stored in non-volatile memory so the microprocessor can restore them each time the scanner is turned on, or alternatively digital potentiometers with their own non-volatile memory can be used.

The scanning module described above may be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and descried as embodied in a method of operating an adaptive bar code scanner, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic of specific aspects of this invention and, therefore, such adoptions should and are intended to be comprehended within the meaning and range of equivalence of the following claims.

We claim:

1. A hand-mountable data processing device comprising:
   a housing mountable on the back of a user's hand, the housing having two side panels arranged to lie perpendicular to a palm of the hand and attached to a top panel arranged to lie parallel to the palm of the hand;
   a palm strap capable of extending around the palm of the hand and fastening at each of two ends of the strap to the two side panels, wherein one end of the palm strap is pivotally fastened to one of the side panels;
   a wrist strap connected to the top panel and capable of extending around the wrist of the user;
   a data entry member mounted on the top panel;
   a display mounted on the top panel for displaying data; and
   communications interface for providing communication between the data entry member, the display and devices external to the data processing device.

2. The hand-mountable data processing device of claim 1, further including a device, mounted in the housing, for reading bar code symbols.

3. The hand-mountable data processing device of claim 2, wherein the device for reading a bar code symbol includes:
   a light source for generating a light beam directed toward the symbol; and
   a detector for receiving light reflected from the symbol and producing electrical signals corresponding to the symbol.

4. The hand-mountable data processing device of claim 3, wherein the device for reading a bar code symbol further includes:
   a signal processing circuit for processing and decoding the electrical signals.

5. The hand-mountable data processing device of claim 4, wherein the display includes a means for displaying the decoded electrical signals.

6. The hand-mountable data processing device of claim 3, further including a memory for storing data.

7. The hand-mountable data processing device of claim 3, further includes means for adjusting an optical focus of the device for reading bar code symbols.

8. The hand-mountable data processing device of claim 3, wherein the device for reading bar code symbols has a first and a second operating mode.

9. The hand-mountable data processing device of claim 8, wherein the device for reading bar code symbols further includes:
   means for decoding the processed electrical signals and for outputting the decoded data to the display when the device is in the second operating mode.

10. The hand-mountable data processing device of claim 8, wherein the data entry member includes means for receiving from a user a selection signal indicating the first or second mode.

11. The hand-mountable data processing device of claim 2, wherein the data entry member includes means for allowing a user to activate the device to read bar code symbols.

12. The hand-mountable data processing device of claim 2, wherein the data entry member includes means receiving from a user signals selecting parameters of the device for reading bar code symbols.

13. The hand-mountable data processing device of claim 12, wherein the data entry member includes means for allowing the user to select a scanning angle for scanning a bar code symbol.

14. The hand-mountable data processing device of claim 13, wherein the data entry member includes means for allowing the user to select an intensity of the light beam generated by the light source.

15. The hand-mountable data processing device of claim 1, wherein the data entry member includes a keyboard.

16. The hand-mountable data processing device of claim 1, wherein the wrist strap includes:
 a flexible portion extending from the top panel of the housing toward the user's wrist, and
 a second portion for extending around the wrist of the user.

* * * * *

UNITED STATES PATENT AND TRADEMARK OFFICE
CERTIFICATE OF CORRECTION

PATENT NO.: 6,015,090

DATED: January 18, 2000

INVENTOR(S): Jerome Swartz et al.

It is certified that an error appears in the above-identified patent and that said Letters Patent is hereby corrected as shown below:

Title page, item [63] should be -- This application is a continuation of 08/415,503 filed April 3, 1995, abandoned, which is a divisional of 08/317,775 filed October 4, 1994, which is a continuation of 07/897,835 filed June 12, 1992, abandoned. --

Signed and Sealed this

Twentieth Day of February, 2001

*Attest:*

NICHOLAS P. GODICI

*Attesting Officer*   Acting Director of the United States Patent and Trademark Office